United States Patent [19]

Rothchild

[11] 4,246,714

[45] Jan. 27, 1981

[54] MULTI-SIDED DISPLAY DEVICE

[75] Inventor: Alan J. Rothchild, East Hills, N.Y.

[73] Assignee: Rothchild Printing Company, Inc., Elmhurst, N.Y.

[21] Appl. No.: 1,335

[22] Filed: Jan. 5, 1979

Related U.S. Application Data

[63] Continuation-in-part of Ser. No. 824,200, Aug. 12, 1977, abandoned.

[51] Int. Cl.[3] .............................................. G06F 1/06

[52] U.S. Cl. ...................................... 40/538; 40/617; 46/30

[58] Field of Search ...................... 40/124.1, 617, 539, 40/124.2, 124.4, 405; 46/12, 13, 21, 30, 157

[56] References Cited

U.S. PATENT DOCUMENTS

| | | | |
|---|---|---|---|
| 1,162,230 | 11/1915 | Foster | 40/124.1 |
| 2,032,531 | 3/1936 | Eaton | 46/34 |
| 2,068,440 | 1/1937 | Sunderhauf | 40/539 |
| 2,183,443 | 12/1939 | Bracker | 46/12 |
| 2,454,307 | 11/1948 | Cooley | 46/30 |
| 3,708,899 | 1/1973 | Berry, Jr. | 40/124.1 |
| 3,977,109 | 8/1976 | Berry, Jr. et al. | 40/124.1 |
| 4,024,656 | 5/1977 | Farnsworth | 40/124.1 |

FOREIGN PATENT DOCUMENTS

| | | | |
|---|---|---|---|
| 113330 | 2/1918 | United Kingdom | 40/124.1 |

OTHER PUBLICATIONS

*Yogi Bear: The Bumble-Bee Wedding,* submitted by applicant.

*Primary Examiner*—Richard C. Pinkham
*Assistant Examiner*—Scott L. Brown
*Attorney, Agent, or Firm*—Blum, Kaplan, Friedman, Silberman and Beran

[57] ABSTRACT

A multi-sided display device assembleable from a plurality of sheets bound in book-like fashion by a binding allowing free movement of the sheets. Each sheet is cut-out to define a display flap which is selectively displaceable away from the uncut bound portion. The cut-out portions are adapted to form a self-locking coupling with an adjacent sheet to form a three dimensional device with a substantially regular polygon formed on a plane perpendicular to the sheets. The invention allows fabrication of the device from a flexible material.

12 Claims, 10 Drawing Figures

MULTI-SIDED DISPLAY DEVICE

CROSS-REFERENCE TO RELATED APPLICATION

This is a continuation-in-part application of Ser. No. 824,200 filed on Aug. 12, 1977, now abandoned.

BACKGROUND OF THE INVENTION

This invention relates generally to an improved display device, and in particular to an improved multi-sided display device formed from a plurality of sheets bound in book-like fashion which is readily assembleable and easily suspended.

Three-dimensional displays of various shapes and forms are well-known in the art. However, multi-sided displays of more than two sides for carrying display messages are generally difficult to construct and assemble. These devices are often bulky, awkward and expensive to produce. Construction of these devices require many cut and scoring lines in cardboard or similar material in order to enable on site assembly. Assembly is difficult as more than one piece of material is involved. The devices often require glue or taping of sides and flaps to provide sufficient structural rigidity to assemble the display. It is also difficult to fold the displays flat for shipping as they are generally awkward in shape and make packing a problem. Often these devices require additional packing material to provide rigidity for shipping. In addition, they may be disassembled and reassembled readily without damaging the device.

One such alternative has been to provide an expanded book-like toy which may be unfolded. However, the proposal is not completely satisfactory when the individual book pages are of a relatively flexible stock, such as Bristol board and it is desired to suspend from the center of the assembled device. The flexible nature of the pages themselves tends to unsecure interlocking tabs aligned vertically. When a more rigid stock is used many scoring lines are needed to impart sufficient rigidity. Accordingly, it is desirable to provide an improved three-dimensional display of simplified construction.

SUMMARY OF THE INVENTION

Generally speaking, in accordance with the invention, an improved multi-sided display device assembleable from a plurality of pages bound in book-like fashion is provided. The sheets are bound by a binding allowing the free movement of the sheets. A display device constructed and arranged in accordance with the invention includes a plurality of sheets, each having a cut-out display flap selectively displaceable away from the remaining portion of the sheet which is bound by the binding. Each display flap is formed with at least two interlocking tabs for coupling with receiving slots formed in the outer portion of an adjacent sheet. A self-locking tab configuration prevents unintentional disassembly. When each display flap is coupled, the assembled device forms a regular polygon on a plane intersecting the sheets as a right angle.

Accordingly, it is an object of the invention to provide an improved multi-sided display device formed from individual sheets.

Another object of the invention is to provide an improved multi-sided display device which is readily assembleable and will not unintentionally disassemble.

A further object of the invention is to provide an improved self-locking tab configuration for a multi-sided display device.

Yet a further object of the invention is to provide an improved multi-sided display device which folds flat to a single self-reinforcing piece when unassembled for easy packing and shipping.

Another object of the invention is to provide an improved multi-sided display device which may be suspended easily when assembled.

Another object of the invention is to provide a multi-sided display device which may be easily disassembled and reassembled without damaging the device in any way.

Another object of the invention is to provide an improved multi-sided display device which is designed to respond to air currents when suspended.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
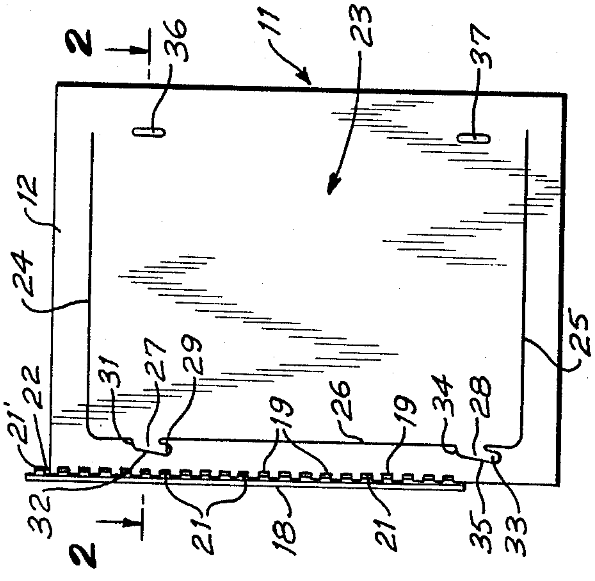
FIG. 1 is a plan view of the unassembled display device.
Figure 2:
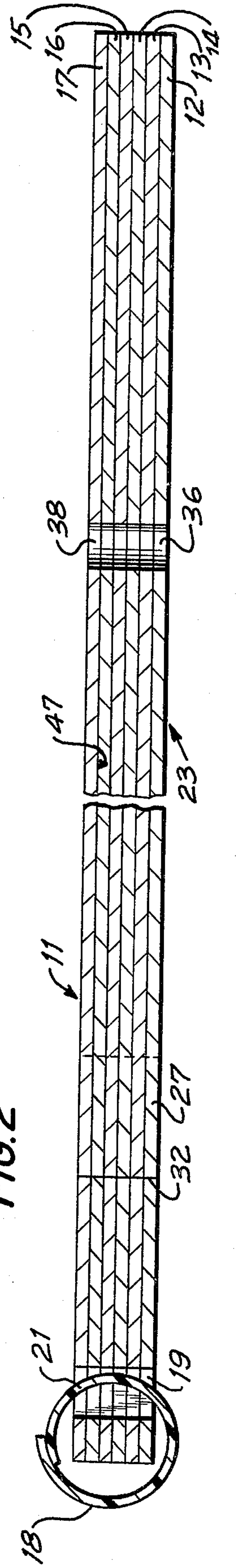
FIG. 2 is a cross-sectional view of the display device taken along line 2—2 of FIG. 1.

Referring now to FIGS. 1 and 2, an unassembled display device constructed and arranged in accordance with the invention is shown generally at 11. Display device is formed from six sheets, first sheet 12 through sixth sheet 17, respectively, bound in book-like fashion at one edge by a comb binding 18 which will define a substantially vertical axis for device 11 when assembled. Each sheet 12 through 17 is cut-out in the same manner as will be described with respect to first sheet 12.

Figure 8:
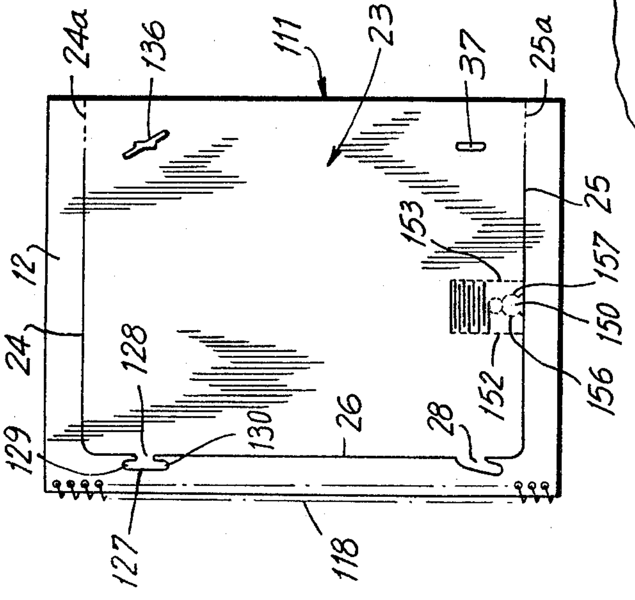
FIG. 8 is a plan view of an unassembled device including a self-locking tab configuration constructed and arranged in accordance with a second embodiment of the invention.
Figure 10:
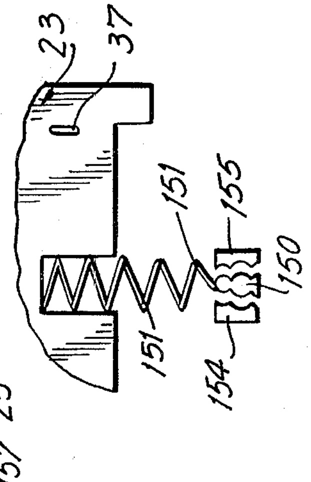
FIG. 10 is a partial plan view of a further embodiment of the invention.

Sheet 12 is substantially rectangular in shape and formed with a series of binding holes 19 along at least a portion of the longer dimension for receiving binding teeth 21 of binding 18. Binding 18 is shown positioned in binding holes 19 so that at least one top binding tooth 21' extends beyond the upper edge of sheets 12 and 17 to define a gap 22. Binding 18 is shown as a comb binding, but may be a spiral or ring binding or any type of binding which permits the free movement of the sheet along a plane perpendicular thereto may be used. For example, sheet 12 must be free to cooperate with sixth sheet 17 without creasing the sheets. A spiral binding 118 is shown in the embodiment of FIG. 8 which will be discussed in more detail below.

Sheet 12 is cut to define a selectively displaceable display flap 23 which carries graphics, such as a display or printed message on the front surface of the flap. The invention will be described with graphics on the front surface of sheet 12 as shown in the drawings. However, it is within the scope of the invention to place graphics on the backside, front side or both front and back sides of each display flap. In order to display the back sides, the mobile is assembled in the reverse direction from that described below.

Display flap 23 of first sheet 12 is defined by an upper cut line 24 substantially parallel to the top edge of sheet 12 extending across a portion of the shorter dimension of sheet 12, and a lower cut line 25 substantially parallel to line 24 extending across a portion of the shorter dimension of sheet 12 for the same distance as line 24. Line 24 and line 25 are joined near the binding edge of sheet 12 by a vertical line 26 substantially parallel to binding 18 extending along the portion of sheet 12 between line 24 and line 25.

Line 26 defines an upper tab 27 and a lower tab 28. Upper tab 27 is formed with a downwardly projecting lip 29 and is defined by a cut-out region in sheet 12 having an upper edge 31 extending towards binding 18 and an outside edge 32 which defines an acute angle with binding 18. Lower tab 28 is formed with a downwardly projecting lip 33 which is longer than lip 29 of upper tab 27. Lower tab 28 is also defined by a similar cut-out region in sheet 12 having an upper edge 34 extending towards binding and an outside edge 35 substantially parallel to outside edge 32 of upper tab 27. The advantages of this tab construction will be described more fully with respect to the manner of assembly of device 11.

Figure 5:
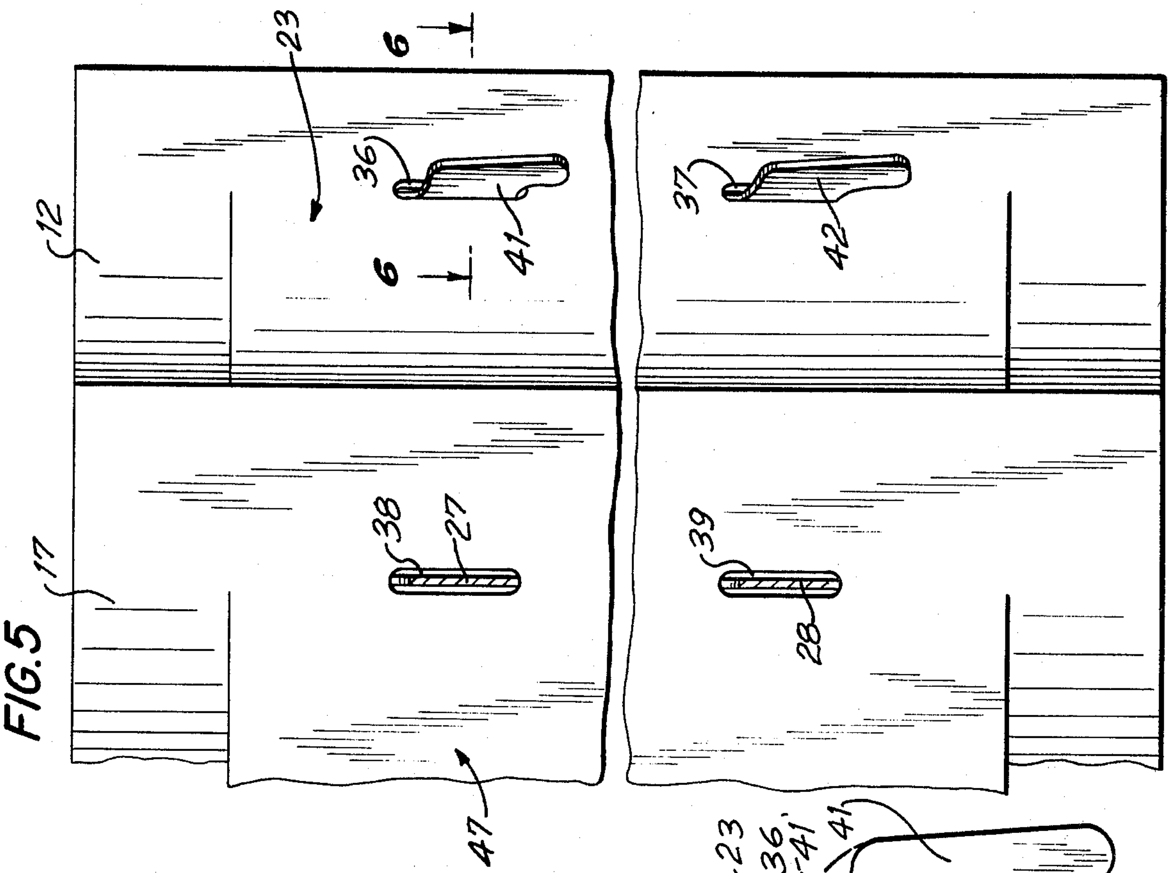
FIG. 5 is a partial cross-sectional view of the tab portion of a display sheet taken along line 5—5 of FIG. 4.

Sheet 12 is formed with an upper receiving slot 36 and a lower receiving slot 37 near the outside edge of bound sheet 12. Upper receiving slot 36 and lower receiving slot 37 are longitudinal in shape having a width larger than the thickness of a sheet and a vertical dimension of about the same size as outside edge 32 of upper tab 27. Upper slot 36 and lower slot 37 are positioned to receive upper and lower tabs from an adjacent sheet as shown in FIGS. 3 and 5.

When display device 11 is assembled, first sheet 12 is unfolded towards a user and display flap 23 is pushed away from sheet 12 toward the user and brought around so that upper tab 27 and lower tab 28 may be inserted into the respective receiving slots in sixth sheet 17. As shown in FIG. 5, upper tab 27 interlocks with an upper receiving slot 38 of sixth sheet 17 and lower tab 28 of first sheet 12 is inserted partially into lower receiving slot 39 to align tab 28. As lip 33 of lower tab 28 is longer than lip 29 of upper tab 27, upper tab 27 may be inserted directly into upper receiving slot 38 once lower tab 28 is inserted partially into lower receiving slot 39. Once upper tab 27 and lower tab 28 are inserted fully into their respective receiving slots, the completed interlocking of display flap 23 into sixth sheet 17 is as shown in FIG. 5.

Figure 3:
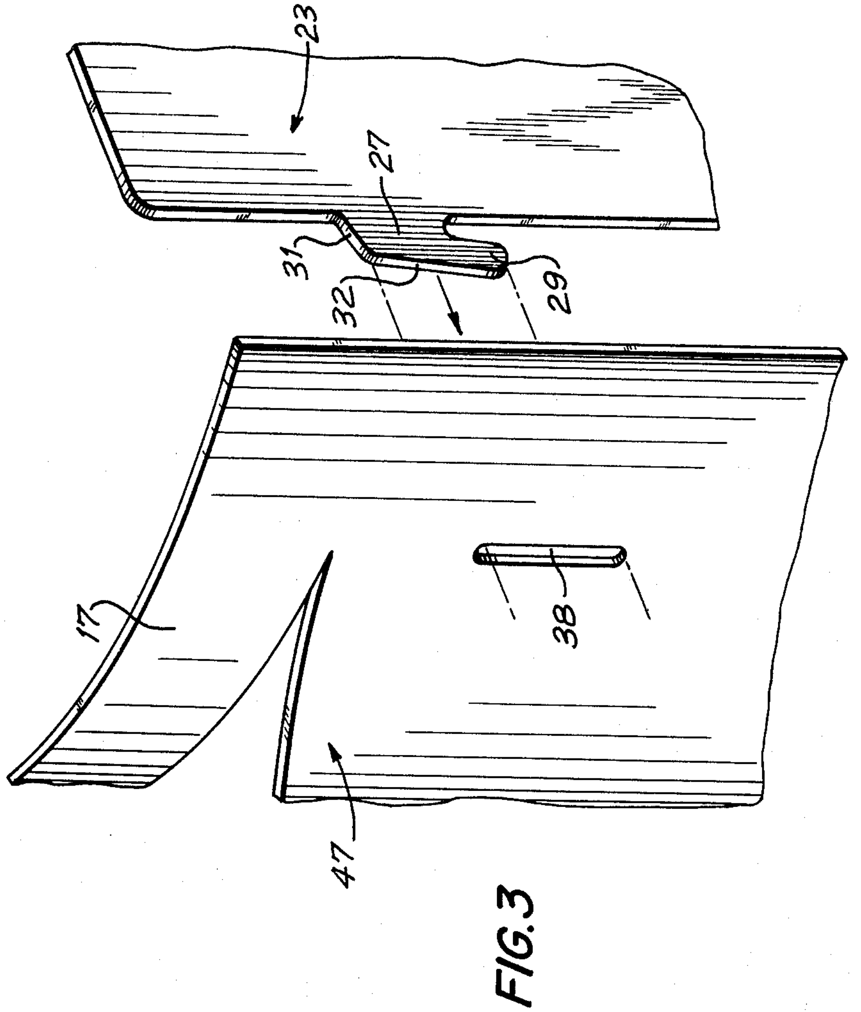
FIG. 3 is a partial perspective view showing a tab assembly.

Referring now to FIG. 3, upper tab 27 of sheet 12 is shown in position to be inserted into upper receiving hole 38 in sixth sheet 17. Once flap 23 has been coupled, this assembly process is continued by pushing away the display portion 43 formed in second sheet 13 and inserting an upper tab 41 and a lower tab 42 formed thereon into respective tabs into the respective upper receiving slot 36 and lower receiving slot 37 of first sheet 12. The process is continued until all the sheets have been coupled to the preceding adjacent sheet with the display flap of each sheet facing outward. When the display is carried on the back side of the display flaps, the adjacent sheet will be the succeeding sheet and display flap 47 of sixth sheet 17 will be coupled to first sheet 12.

Figure 4:
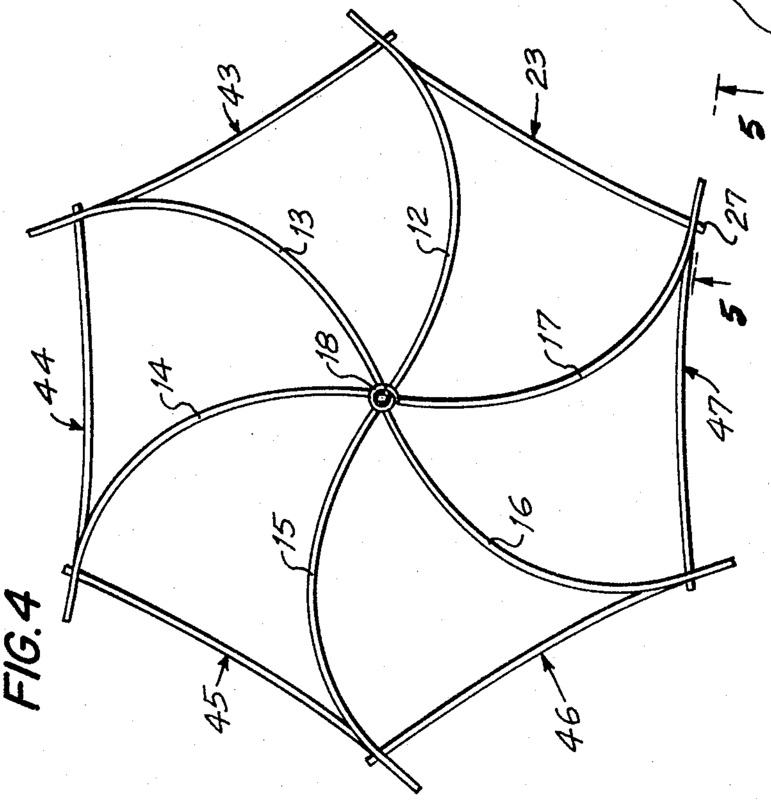
FIG. 4 is a top plan view showing the assembled display device.

A top plan view of assembled display device 11 is shown in FIG. 4 with each display flap facing outward. The uncut bound portions of each sheet shown in FIG. 4 as 12 through 17 form flared radials extending from binding 18 through a vertex angle defined by the intersection of an interlocking display flap and an adjacent sheet. There are as many vertex angles as there are sheets and outwardly facing display panels are identified in FIG. 4 as 23, 43, 44, 45, 46 and 47 for first sheet 12 through sixth sheet 17, respectively. As shown in FIG. 4, the assembled device 11 defines a substantially regular polygon in a plane perpendicular to binding 18.

Figure 7:
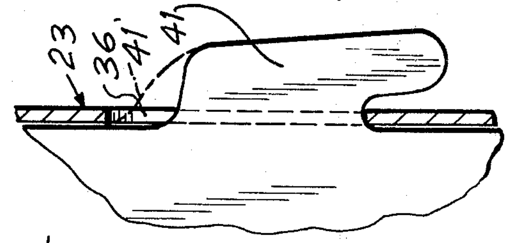
FIG. 7 is a partial cross-sectional view taken along line 7—7 of FIG. 6.
Figure 6:
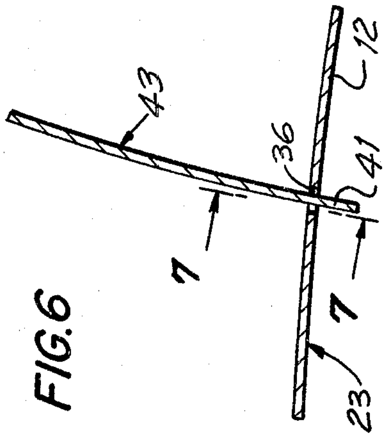
FIG. 6 is a partial cross-sectional view taken along line 6—6 of FIG. 5.

The manner in which display panel 43 of second sheet 13 intersects display panel 23 of first sheet 12 to form a vertex angle is shown in FIG. 6. In FIG. 7, the coupling position of upper tab 41 of second sheet 13 is shown in upper receiving slot 36 of first sheet 12. Upper tab 41 is shown with an upper edge 41' in phantom which is formed so that inserted tab 41 almost fills slot 36. In this embodiment of the invention each upper tab of each sheet is formed in this manner to provide greater structural integrity to device 11.

In order to disassemble device 11, an interlocked display flap is lifted away from its receiving slots and returned to the cut-out in the sheet. This is done for each sheet until device 11 is returned to its original unassembled form as shown in FIG. 1 ready for reassembly without damage to the device.

In another preferred embodiment of the invention, at least one of the upper and lower tab configurations includes a receiving slot which is slanted with respect to the vertical axis. A corresponding notch or upwardly extending lip is formed in the upper edge of the tab to form a self-locking configuration. This self-locking configuration provides an assembled device of improved rigidity which will not disassemble unintentionally.

Figure 9:
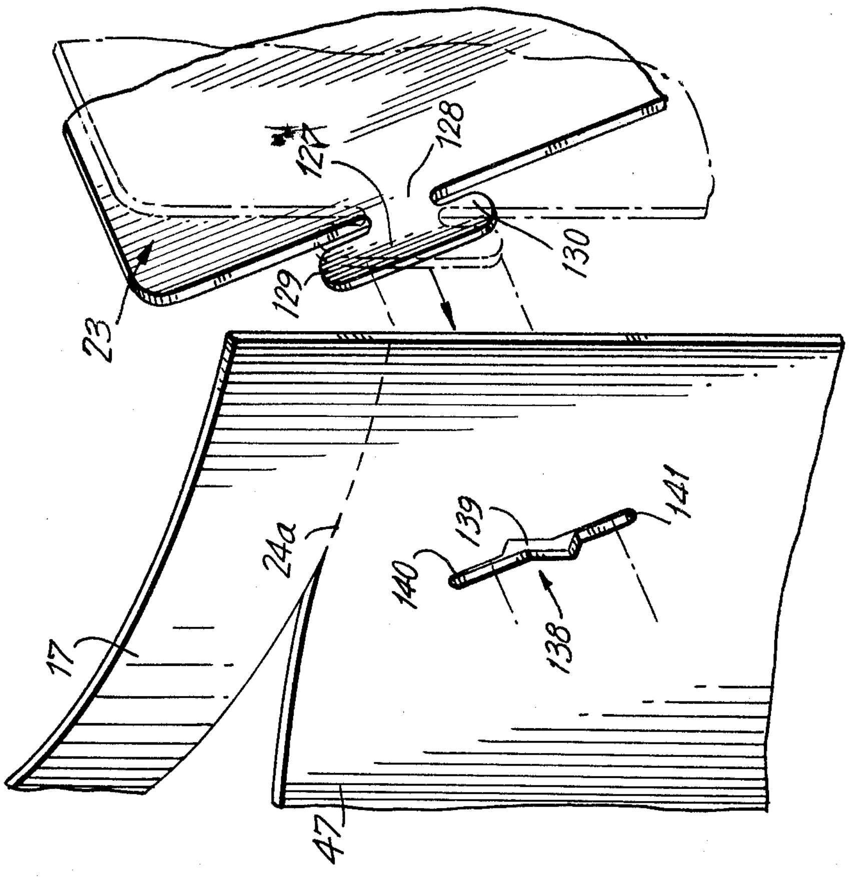
FIG. 9 is a partial perspective view showing the upper tab assembly of the device of FIG. 8.

The self-locking tab configuration is shown in FIGS. 8 and 9 wherein the same reference numerals are used to identify the elements of a device 111 described with respect to FIGS. 1–7. Referring specifically to FIG. 8, first sheet 12 of device 111 is shown formed with an upper tab shown generally as 127 and an upper receiving slot shown generally as 136 constructed and arranged in accordance with the second embodiment of the invention to form the self-locking tab configuration. Upper tab 127 is formed with a neck portion 128, an upwardly projecting lip 129 and a downwardly projecting lip 130 defined by cut line 26. Upper receiving slot 136 is formed proximate the outside edge of first sheet 12 for receiving an upper tab formed in second sheet 13 which corresponds to upper tab 127 of first sheet 12.

Referring specifically to FIG. 9, the details of construction with respect to the upper receiving slots will be described with respect to upper receiving slot 138 formed in sixth sheet 17. An upper receiving slot shown generally as 138 formed in sixth sheet 17 is shown with sixth sheet in position for receiving display panel 23 of first sheet 12. Upper receiving slot 138 includes a vertical rectangular slot portion 139 with its longer dimension substantially parallel to the outside edge of sixth sheet 17, an upper elongated diagonal slot region 140 and an opposed lower elongated diagonal slot region 141. Upper elongated diagonal slot portion 140 is shown facing towards the bound edge of sixth sheet 17 and lower elongated diagonal slot portion 141 is shown extending towards the outside edge of sixth sheet 17. It is to be understood that it is within the scope of the invention to displace the elongated slot portions so that upper elongated diagonal slot portion 140 extends towards the outside edge of sixth sheet 17 and opposed lower elongated slot portion 141 extends towards the bound edge of sixth sheet 17.

Opposed diagonal slot portions 140 and 141 are cut in sufficient length to permit upwardly projecting lip 129 and downwardly projecting lip 130 of upper tab 127 formed in display panel 23 of first sheet 12 to pass therethrough during assembly. Rectangular slot region 139 of upper receiving slot 138 is formed with a length substantially equal to the longer dimension of neck portion 128 of upper tab 127.

When display device 111 constructed and arranged in accordance with this self-locking embodiment of the invention is assembled, first sheet 12 is unfolded towards a user and display flap 23 is pushed away from sheet 12 towards the user and brought around so that upper tab 127 and lower tab 128 may be inserted into the respective receiving slots 138 and 39 formed in sixth sheet 17. Lower tab 28 of first sheet 12 is inserted into lower receiving slot 39 of sixth sheet 17 and the upper portion of display panel 23 is flexed to align upper tab 127 with the opposed diagonal receiving slots 140 and 141 of upper receiving slot 138 in sixth sheet 17. Once aligned, upper tab 127 is inserted through upper receiving slot 138 and returned to its substantially vertical alignment so that neck portion 128 is received within vertical slot region 139 of upper receiving slot 138 of sixth sheet 17. As with the previously described embodiments of the invention, this assembly procedure is repeated for the remaining five bound sheets of display device 111 until assembly is completed.

It has been found that display device 111 constructed and arranged in accordance with this self-locking embodiment of the invention is easily assembled and possesses increased structural rigidity and stability. This embodiment provides improved interlocking due to the self-locking nature of the coupling of upper tab 127 in slot 138. This occurs due to the bias of the sheet as the region about upper tab 127 was flexed to be inserted through regions 140 and 141. Once tab 127 is in the normal position lower tab 28 is forced down and into slot 39, thereby providing the additional locking feature. Device 111 will not disassemble unintentionally under normal circumstance. In order to disassemble device, including a self-locking tab configuration, upper tab 127 must be turned to align with regions 140–141 prior to removal.

Once assembled, device 111 may be suspended easily by inserting a string loop or suitable hook (not shown) into an element of binding 118. The string or hook raised to lift the device may be secured in any desirable location. Flared radials are formed by the uncut bound portions of sheets 12 through 17 and the acute angles formed by an intersecting display flap and the back of an adjacent display portion when a flexible stock is used which is free of score lines in the region between receiving slots. Such a device is responsive to small air currents causing the device to rotate slowly.

Referring again to FIG. 8, upper and lower cut lines 24 and 25 may be extended to the outside edge of first sheet 12 by a dash cut portion 24*a* and 25*a*, respectively. By doing so the display panels may be removed from device 111 by tearing along dash cut score lines 24*a* and 25*a*. It may be convenient to do so once the display function of device 111 is complete. In another use of the device of the invention, display panels 23 may be printed on the rear for use as post cards or the like.

Device 111 may also include a dangler member formed in one or more of the display panels. In FIG. 8, a dangler 150 is shown cut out in display panel 23 and attached by a series of alternating support strips 151 cut from display panel 23. If it is desired to form dangler 150 in a figure shape as shown, unnecessary portions 154 and 155 which have been cut by two dash cut lines 156 and 157 around dangler 150 and removed when dangler 150 is suspended from an assembled device 111. Dangler member 150 may be cut in any desired shape and provided on any number of the display panels.

A display device has been defined with respect to an exemplary embodiment having six sheets and six display panels. However, it is within the scope of the invention to vary the number of sheets and corresponding display sides. There must be at least three sheets which will define three vertex angles and, of course, no upper limit to the number of sheets. However, when varying the number of display flaps, the relative size of each display portion must be adjusted accordingly. The more sheets included, the smaller each display panel will become.

In the embodiment shown in the drawing, each sheet 12 through 17 is Bristol board of about $10\frac{1}{2}$ inches by $13\frac{3}{4}$ inches. Lines 24, 25 and 26 which define display flap 23 are about 1 inch from respective edges of sheet 12. Display flap 23 of this exemplary embodiment defines a $9\frac{1}{2}$ inch by $11\frac{3}{4}$ inch display area which yields a total display area of about 670 square inches on the six sides. A display device dimensioned about 2 inches by 5 inches may conveniently be used as an advertising medium containing six usuable postal cards when the display panels are provided with dash cut sectioning lines extending to the outside edge of each display flap as described above.

The invention has been described with sheets 12 through 17 substantially rectangular in shape. It is within the scope of the invention to vary the shape of the sheets and the cut-out display flaps. Similarly, the location of the tabs and receiving slots may be varied and more than two may be provided to increase the structural integrity of the assembled device. Sheets 12 through 17 may be formed from cardboard or other suitable flexible material which can carry a display, such as plastic or metal foil.

Accordingly, it is apparent that a display device constructed in accordance with the invention may be shipped flat and easily assembled and disassembled repeatedly without ruining the device. In addition, the invention provides a multi-sided poster or a display device which offers substantial display area over individually printed sheets of much smaller size in a graphically pleasing arrangement. As noted above, the device may contain postal cards which can be removed from the device by tearing along a dash cut portion. In addition, the device may be used as a toy item including a picture for coloring on the display flaps which can then be suspended, once completed.

It will thus been seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What is claimed is:

1. A multi-sided display device assembleable from a plurality of flexible sheets bound in book-like fashion comprising:

at least three sheets, each formed with a cut-out display flap selectively displaceable away from the uncut remaining portion of said sheets;

binding means for binding said sheets along at least a portion of one edge of said uncut portion of said sheets, said binding means allowing free movement of said sheets and defining a central axis of said device when assembled;

each display flap formed with at least two interlocking tabs defined by a cut-line substantially parallel to said axis, said tabs projecting towards said binding means and one of said interlocking tabs being a self-locking tab formed with a projecting neck region and two opposed lips extending substantially parallel to said axis; and each uncut portion of said sheets on the side away from said axis formed with at least two cooperating elongated receiving slots for receiving said tabs, said slot for receiving said self-locking tab being formed at an acute angle to the axis and including a central region substantially parallel to the axis and dimensioned to engage the neck of said self-locking tab when parallel to the axis for maintaining said other tab in engagement with the corresponding slot for preventing disassembly of the device when assembled, whereby said tabs interlock with said receiving slots formed in an adjacent sheet, said uncut portion of said sheet adapted to form flared radials extending from said binding means through the vertex angles of said device when viewed in plan views.

2. The display device of claim 1, wherein said display flaps are substantially rectangular in shape and lie in vertical planes parallel to said binding means when said device is assembled, said display flaps defined by a cut-line extending substantially perpendicular to said binding means and across a portion of the opposed free sides of said sheets and the cut-line extending substantially parallel to said binding means.

3. The display device of claim 2, wherein said sheets are substantially rectangular.

4. The display device of claim 2, wherein the remaining portions of said cut-lines perpendicular to the axis are extended to the outside edge of said sheets by a dash-cut line to permit removal of said display panels by tearing along said dash-cut portions.

5. The display device of claim 4, including six sheets.

6. The display device of claim 1, including a dangler member cut out from at least one of said display flaps for selectively being suspended from said assembled device, said dangler member joined to said display flap by a plurality of alternately cut strips from said display flap.

7. The display device of claim 1, wherein said two interlocking tabs are included and the upper tab is the self-locking tab with the upper cooperating slot formed at an actue angle to the axis.

8. The display device of claim 1, wherein said material is Bristol board.

9. The display device of claim 1, wherein said display flap is free of a score line in the region of said slots.

10. A multi-sided display device assembleable from a plurality of sheets bound in book-like fashion comprising:

six sheets, each formed from a flexible material with a substantially rectangular cut-out display falp selectively displaceable away from the uncut remaining portion of said sheets;

binding means for loosely binding said sheets along at least a portion of one edge of said uncut portion of said sheets and defining a central substantially vertical axis of said device when assembled;

each display flap formed from a cut-line substantially parallel to said axis with at least two interlocking tabs defined by said cut-line, said tabe projecting towards said binding means; and each uncut portion of said sheets formed with at least two elongated receiving slots for receiving said tabs for coupling said display flaps to an adjacent sheet, the lower tab including a downwardly projecting lip adapted to interlock with the associated lower elongated slot, said lower slot substantially parallel to said binding means, and the upper tab is a self-locking tab formed with a projecting neck and an upwardly and a downwardly extending lip and the associated upper slot formed with an elongated region at an acute angle to the binding means and a substantially vertical central region parallel to the axis and dimensioned to engage the neck for retaining said upper tab when inserted, whereby coupling said upper tab forces said lower tab into engagement with the corresponding slot and forms a self-locking configuration for the device, the sheets forming flared radials extending from the binding means through the vertex angles when the device is assembled and viewed in plan view.

11. The display device of claim 10, wherein said flexible material is Bristol board.

12. The display device of claim 11, wherein each of said sheets is free of fold lines.

* * * * *